(12) United States Patent
Lin et al.

(10) Patent No.: US 10,020,703 B2
(45) Date of Patent: Jul. 10, 2018

(54) WINDING STRUCTURE OF A STATOR AND ELECTRIC MACHINERY USING THE STATOR

(71) Applicants: Kau-Her Lin, Kaohsiung (TW); Shih-Hung Wang, Kaohsiung (TW)

(72) Inventors: Kau-Her Lin, Kaohsiung (TW); Shih-Hung Wang, Kaohsiung (TW)

( * ) Notice: Subject to any disclaimer, the term of this patent is extended or adjusted under 35 U.S.C. 154(b) by 367 days.

(21) Appl. No.: 15/013,961

(22) Filed: Feb. 2, 2016

(65) Prior Publication Data
US 2016/0226329 A1    Aug. 4, 2016

(30) Foreign Application Priority Data

Feb. 4, 2015   (TW) .............................. 104103722 A
Jan. 29, 2016   (TW) .............................. 105102849 A

(51) Int. Cl.
*H02K 3/28*    (2006.01)
*H02K 3/12*    (2006.01)

(52) U.S. Cl.
CPC ................. *H02K 3/28* (2013.01); *H02K 3/12* (2013.01); *H02K 2213/03* (2013.01)

(58) Field of Classification Search
CPC .................. H02K 3/00–3/528; H02K 2213/03
See application file for complete search history.

(56) References Cited

U.S. PATENT DOCUMENTS 8,928,199 B2    1/2015   Wang et al.

FOREIGN PATENT DOCUMENTS

| CN | 101510702 A | 8/2009 |
| JP | S5645849 A | 4/1981 |
| TW | I497871 B | 8/2015 |

*Primary Examiner* — Ramon M Barrera
(74) *Attorney, Agent, or Firm* — WPAT, PC

(57) ABSTRACT

A winding structure of a stator and an electric machinery using the stator are disclosed. The winding structure includes a first magnetic pole, a second magnetic pole, a third magnetic pole, a fourth magnetic pole, a fifth magnetic pole, a sixth magnetic pole, a seventh magnetic pole and an eighth magnetic pole which are arranged in a circumferential direction. The first to eighth magnetic poles are wound with first to eight windings, respectively. Each of the first to eight windings has a number of turns, and the numbers of turns of the first to eight windings are in ratios 1:8:3:4:9:2:7:6. The first to eighth windings have a total number of turns of "40n," and wherein 40n≥720 As such, the electricity generation efficiency of the electric machinery can be improved.

9 Claims, 5 Drawing Sheets

WINDING STRUCTURE OF A STATOR AND ELECTRIC MACHINERY USING THE STATOR

CROSS REFERENCE TO RELATED APPLICATIONS

The application claims the benefit of Taiwan application serial Nos. 104103722 and 105102849, respectively filed on Feb. 4, 2015 and Jan. 29, 2016, and the subject matter of which is incorporated herein by reference.

BACKGROUND OF THE INVENTION

1. Field of the Invention

The present disclosure generally relates to a winding structure of a stator, and an electric machinery using the stator and, more particularly, to the winding of copper coils around such a stator that consists of 8 magnetic poles that interact with an also 8-pole rotor to generate electricity.

2. Description of the Related Art

Stators are essential components for constructing electric machinery that includes motor and generator. Among various kinds of electric machinery, designs of stators with 8 magnetic poles, henceforth referred to as 8-pole stators, are indeed not new as they can be found in literature and are available commercially.

In a conventional electric machinery, however, each magnetic pole of the stator has the same number of turns of winding. Therefore, when the electric machinery is in action, every magnetic pole generates electricity of the same magnitude as induced by the magnetic field of the rotor. As a result, the magnetic poles of the rotor, also termed armature, tend to bear a large magnetic impedance when the poles of the rotor are in transit between two adjacent magnetic poles of the stator. Such typically large magnetic impedance is one of the main factors that lead to energy loss to heating and poor efficiency of the electric machinery.

As a consequence of such heating loss, the temperature of each magnetic pole of the stator would increase after the electric machinery operates for certain duration of time. Because of the even number of windings of the stator and the rotor, the heating loss are also evenly distributed to each pole, hence causing largely equal rise of temperature. The eventual high temperature of the magnetic poles of the stator always compromises the operational efficiency of the rotor in various general ways. Even worse, the temperature of the rotor will also increase as the temperature of the stator rises, either due to radiation or by convection. Consequently, unless properly dissipated, the heating problem would cause various detrimental effects to a conventional electric machinery, including lifetime, energy efficiency, and environmental issues, among others.

It has been known that when the overall temperature of the electric machinery increases, the magnetic loss due to the iron core, including the magnetic hysteresis loss and eddy current loss, and resistive loss of the copper windings of the electric machinery would also increase, leading to increased power losses, both the active and the reactive components, of the electric machinery and, thus, significantly lowering the efficiency of an electric machinery. In all, the rotor needs to bear a higher magnetic impedance during rotation and thus if the heat dissipation issues cannot be resolved, any attempt to further improve the efficiency of electric generation or conversion of electric power would prove difficult, if possible at all.

SUMMARY OF THE INVENTION

The objective of this disclosure is, therefore, to provide a solution to the heating problems via a novel design of winding structures based on the general concept of an 8-pole stator of uneven copper winding, in which two adjacent magnetic poles of the 8-pole stator generate the magnetic fields with different magnitudes via different numbers of turns of the windings thereof. Thus, by properly arranging the turns at each specific pole so that each pair of the adjacent magnetic poles would generate magnetic fields of accordingly different strengths with greatly reduced magnetic impedance and power losses.

Yet another objective of the disclosure is to provide a winding structure of an 8-pole stator and an electric machinery using the 8-pole stator, in which the temperature increment on each of the magnetic poles in operation is made different via different numbers of turns of windings thereof. As such, the heat that is received by the rotor and the body of the stator during rotation thereof can be internally dissipated inside the electric machinery, thus improving the cooling efficiency and the overall energy efficiency of the electric machinery.

In an embodiment, a winding structure of an 8-pole stator includes a first magnetic pole, a second magnetic pole, a third magnetic pole, a fourth magnetic pole, a fifth magnetic pole, a sixth magnetic pole, a seventh magnetic pole and an eighth magnetic pole of are arranged in a circumferential direction. The first to the eighth magnetic poles are wound with the first to the eight windings, respectively. Each of the first to the eight windings has a number of turns, and the numbers of turns from the first to eight windings are in ratios of 1:8:3:4:9:2:7:6. The first to eighth windings have a total number of turns of "40n," and $40n \geq 720$.

In a form shown, the number of turns of the first winding is "n," the number of turns of the second winding is "8n," the number of turns of the third winding is "3n," the number of turns of the fourth winding is "4n," the number of turns of the fifth winding is "9n," the number of turns of the sixth winding is "2n," the number of turns of the seventh winding is "7n," and the number of turns of the eighth winding is "6n."

In the form shown, each of the first to eighth magnetic poles includes a tooth portion, and the tooth portions of the first to eighth magnetic poles are wound with the first to eighth windings, respectively.

In the form shown, each of the first to eighth magnetic poles includes a plurality of wire slots and a plurality of tooth portions.

In the form shown, the plurality of wire slots includes a first wire slot, a second wire slot, a third wire slot and a fourth wire slot. Each of the first to eighth windings is wound in each of the first and third wire slots first, and then in each of the second and fourth wire slots.

In the form shown, the plurality of wire slots includes a first wire slot, a second wire slot, a third wire slot, a fourth wire slot, a fifth wire slot and a sixth wire slot. Each of the first to eighth windings is wound in each of the first and fourth wire slots first, then in each of the second and fifth wire slots, and finally in each of the third and sixth wire slots.

In the form shown, the first to eighth windings include a plurality of pairs of radially opposing windings. Each of the plurality of pairs of radially opposing windings has the same total number of turns. That is, the total number of turns of the first winding plus the eighth and second windings is the same as the total number of turns of the third winding plus the second and fourth windings, is the same as the total number of turns of the fifth winding plus the fourth and sixth windings, and is the same as the total number of turns of the seventh winding plus the sixth and eighth windings.

In yet another embodiment, an electric machinery including the above 8-pole stator is disclosed. The electric machinery further includes a rotor. The rotor includes 8 armature magnetic poles respectively wound with 8 rotor windings.

In a form shown, each of the 8 rotor windings has a number of turns of "5n."

Thus, in the winding structure of the 8-pole stator and the electric machinery using the 8-pole stator, the magnetic impedance of the armature magnetic poles of the rotor is reduced via the asymmetric arrangement of the windings that produce asymmetric magnetic fields between any two adjacent magnetic poles. As such, the loss of the electric machinery is reduced and the electric generation efficiency thereof is increased. Furthermore, based on the uneven temperature of the magnetic poles of the 8-pole stator, the cooling efficiency of the electric machinery is increased and the electric generation efficiency is improved.

BRIEF DESCRIPTION OF THE DRAWINGS

The present disclosure will be better understood from the detailed description given hereinafter and the accompanying drawings which are given by way of illustration only, and thus are not limitative of the present disclosure, and wherein.

Figure 1:
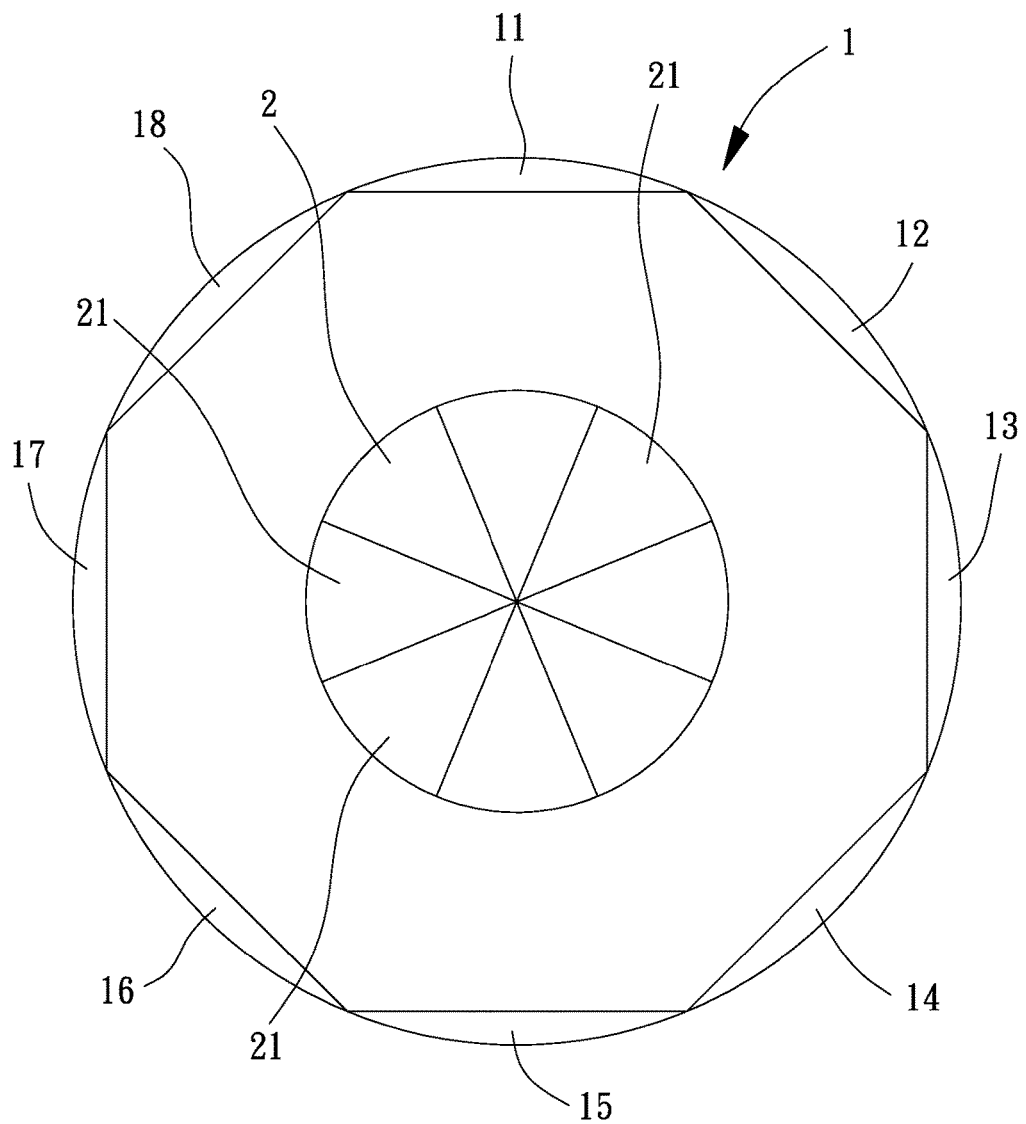
FIG. 1 is a plane view of an electric machinery according to an embodiment of the disclosure.

In the various figures of the drawings, the same numerals designate the same or similar parts. Furthermore, when the terms "first", "second", "third", "fourth", "inner", "outer", "top", "bottom", "front", "rear" and similar terms are used hereinafter, it should be understood that these terms have reference only to the structure shown in the drawings as it would appear to a person viewing the drawings, and are utilized only to facilitate describing the disclosure.

DETAILED DESCRIPTION OF THE INVENTION

FIG. 1 shows an electric machinery according to an embodiment of the disclosure. The electric generator includes an 8-pole stator 1 and a rotor 2. The 8-pole stator 1 has 8 magnetic poles including a first magnetic pole 11, a second magnetic pole 12, a third magnetic pole 13, a fourth magnetic pole 14, a fifth magnetic pole 15, a sixth magnetic pole 16, a seventh magnetic pole 17 and an eighth magnetic pole 18 which are arranged in a circumferential direction (such as in counterclockwise direction or clockwise direction). Each magnetic pole has a respective winding. The windings of the magnetic poles are formed by winding an enameled copper wire around the magnetic poles, and the numbers of turns of the windings on the first to eighth magnetic poles 11-18 are in the ratios 1:8:3:4:9:2:7:6. The electric machinery may implement the disclosure into a motor or an electric generator.

Figure 2:
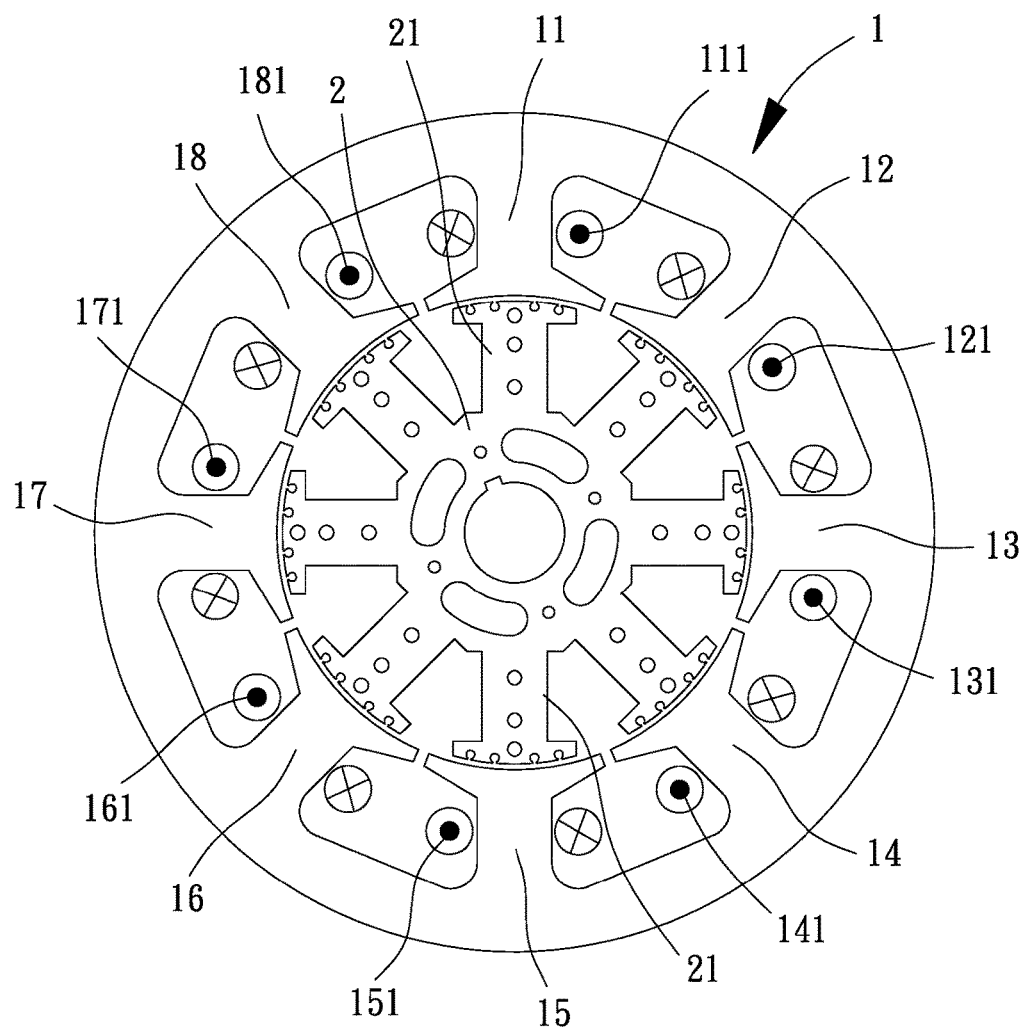
FIG. 2 shows an implementation of the electric machinery of the embodiment of the disclosure.

FIG. 2 shows an implementation of the electric machinery of the embodiment of the disclosure. In the electric machinery, each magnetic pole of the 8-pole stator 1 may include only one wire slot. In other words, each magnetic pole of the 8-pole stator 1 includes a single tooth portion. The tooth portion of the first magnetic pole 11 may be wound with a first winding 111, and the tooth portion of the second magnetic pole 12 may be wound with a second winding 121. Similarly, the tooth portions of the third to eighth magnetic poles 13-18 may be wound with third to eighth windings 131-181, respectively. Based on this, if the number of turns of the first winding 111 is "n," then the number of turns of the second winding 121 is "8n," the number of turns of the third winding 131 is "3n," the number of turns of the fourth winding 141 is "4n," the number of turns of the fifth winding 151 is "9n," the number of turns of the sixth winding 161 is "2n," the number of turns of the seventh winding 171 is "7n," and the number of turns of the eighth winding 181 is "6n." As such, the numbers of turns of the first to eighth windings 111-181 can be in the ratios 1:8:3:4:9:2:7:6.

Besides, the total number of turns of the first to eighth windings 111-181 is expressed as the equation (1) below:

$$1n+8n+3n+4n+9n+2n+7n+6n=40n. \qquad (1).$$

It can be known from the above that when the first winding 111 has "n" turns, the total number of turns of the windings of the 8-pole stator 1 is 40n. As another example, if the number of turns of the first winding 111 is 40n, the total number of turns of the windings of the 8-pole stator 1 is 1600n, as it can be readily appreciated by skilled people.

Referring to FIGS. 1 and 2, the rotor 2 may include eight armature magnetic poles 21, and each armature magnetic pole 21 may be provided with a rotor winding of the same number of turns. An air gap is formed between the 8-pole stator 1 and the armature magnetic poles 21. In this arrangement, if the total number of turns of the 8-pole stator 1 is 40n, the number of turns of the winding on each armature magnetic pole 21 may be calculated as:

$$40n/8=5n. \qquad (2).$$

Namely, the number of turns on each armature magnetic pole 21 may be 5n. Therefore, when the number of turns of the first winding 111 is 18, for example, the number of turns of the winding on each armature magnetic pole 21 is 90.

Figure 3:
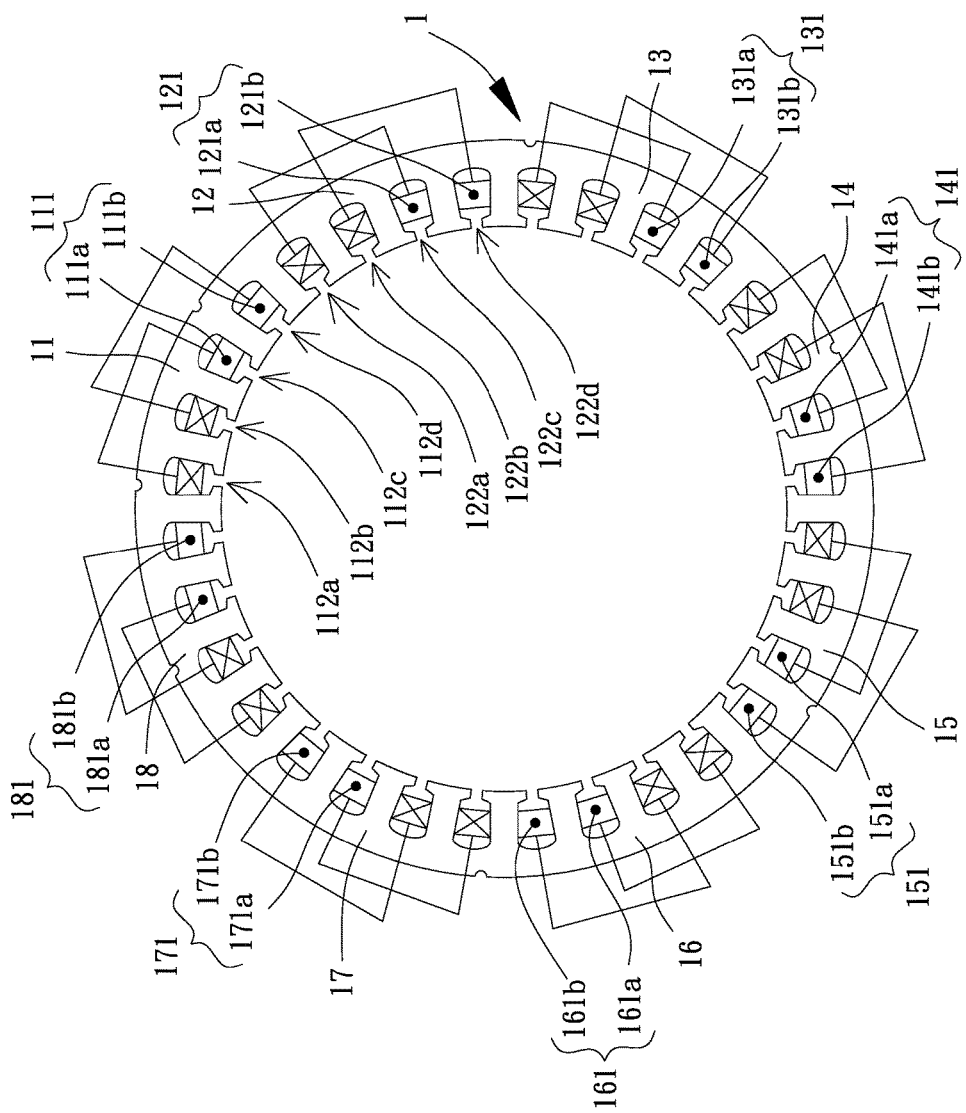
FIG. 3 shows another implementation of the electric machinery of the embodiment of the disclosure.

FIG. 3 shows another implementation of the electric machinery of the embodiment of the disclosure. In the electric machinery, each magnetic pole of the 8-pole stator 1 may include a plurality of wire slots. In other words, each magnetic pole includes a plurality of tooth portions. For example, each magnetic pole includes 4 wire slots so that the pole distance of the 8-pole stator 1 is 4. In the arrangement, the first magnetic pole 11 includes a first wire slot 112a, a second wire slot 112b, a third wire slot 112c and a fourth wire slot 112d. The first winding 111 is wound by "n" turns in each of the first to fourth wire slots 112a, 112b, 112c and 112d. Specifically, a first wire is wound by "n" turns in each of the first and third wire slots 112a and 112c, and then wound by another "n" turns in each of the second and fourth wire slots 112b and 112d, thus forming the first winding 111. The second magnetic pole 12 includes a first wire slot 122a, a second wire slot 122b, a third wire slot 122c and a fourth wire slot 122d. The second winding 121 is wound by "8n" turns in each of the first to fourth wire slots 122a, 122b, 122c and 122d. Similarly, each of the third to eighth magnetic poles 13-18 includes first, second, third and fourth wire slots, and the third to eighth windings 131-181 are respectively wound by "3n," "4n," "9n," "2n," "7n" and "6n" turns in each of the first to fourth wire slots.

Through the above structure, when the electric machinery is in use, the rotor 2 may couple with a shaft that is driven by a power source (such as a motor), such that the rotor 2 may be driven to rotate by the shaft. The characteristics of the electric machinery are as follows.

Specifically, although the first to eighth windings 111-181 of the 8-pole stator 1 have different numbers of turns, each pair of two radially opposing magnetic poles has the same total number of turns of windings as is the case of all other pairs of two radially opposing magnetic poles. More specifically, the first to eighth windings 111-181 have the ratios 1:8:3:4:9:2:7:6 while the first and fifth magnetic poles 11 and 15 are radially opposing to each other, the second and sixth magnetic poles 12 and 16 are radially opposing to each other, the third and seventh magnetic poles 13 and 17 are radially opposing to each other, and the fourth and eighth magnetic poles 14 and 18 are radially opposing to each other. Based on this, each pair of the opposing magnetic poles has the same total number of turns of 10n.

Referring to FIG. 1 again, the total number of turns of the first winding 111 of n turns plus the two adjacent windings (the second winding 121 of 8n turns and the eighth winding 181 of 6n turns) is n+8n+6n=15n, the total number of turns of the third winding 131 of 3n turns plus the two adjacent windings (the second winding 121 of 8n turns and the fourth winding 141 of 4n turns) is 3n+8n+4n=15n, the total number of turns of the fifth winding 151 of 9n turns plus the two adjacent windings (the fourth winding 141 of 4n turns and the sixth winding 161 of 2n turns) is 9n+4n+2n=15n, and the total number of turns of the seventh winding 171 of 7n turns plus the two adjacent windings (the sixth winding 161 of 2n turns and the eighth winding 181 of 6n turns) is 7n+2n+6n=15n. In other words, for each of the odd-numbered first, third, fifth and seventh windings 111, 131, 151 and 171 that are uniformly spaced from each other in the intervals of 90 degrees along a circumferential direction, the total number of turns of said winding plus its two adjacent windings is the same.

Based on the designs that each pair of radially opposing poles has the same total number of turns of windings, as well as that the total number of turns of each of the windings 111, 131, 151 and 171 plus its two adjacent windings is the same, the rotor 2 may rotate relative to the 8-pole stator 1 in a balanced manner as driven by the shaft. Since the first to eighth windings 111-181 have different numbers of turns, a voltage difference is formed between any two adjacent magnetic poles. As an example of the first and second windings 111 and 112 respectively having "n" and "8n" turns, the first and second windings 111 and 112 will have different equivalent voltages when the first to eighth windings 111-181 are electrified. As a result, a voltage difference is formed between the first and second magnetic poles 11 and 12. Thus, the first and second magnetic poles 11 and 12 are able to generate the magnetic fields with different magnitudes. As such, when an armature magnetic pole 21 of the rotor 2 passes through the first and second magnetic poles 11 and 12, the magnetic impedance of the armature magnetic pole 21 is reduced via the difference of the magnetic fields between the first and second magnetic poles 11 and 12, thus ensuring a smooth rotation of the rotor 2.

It is noted that the total number of turns of the windings of the 8-pole stator 1 is preferably larger than or equal to 720 in order to ensure that the difference of the magnetic fields between two adjacent magnetic poles is sufficient in reducing the magnetic impedance of the armature magnetic poles 21. In this regard, the number of turns of the first winding 111 is preferably larger than or equal to 18, which satisfies the equation of 40n≥720. Specifically, since the total number of turns of the windings of the 8-pole stator 1 is proportional to the voltage value generated during the operation of the 8-pole stator 1, the total number of turns of the windings of the 8-pole stator 1 is designed to be larger than or equal to 720. This does effectively increase the difference of the magnetic fields between two adjacent magnetic poles. Furthermore, since the total number of turns of the 8-pole stator 1 is designed to be larger than or equal to 720, the difference of the magnetic fields between two adjacent magnetic poles can be effectively increased. This design also satisfies the required operational condition of the 8-pole stator 1 in terms of high voltage and low current while reducing the thickness of the silicon steel plates forming the 8-pole stator 1. Advantageously, the weight and production cost of the 8-pole stator 1 is reduced.

Furthermore, since the windings of the magnetic poles have different numbers of turns, each winding has a different equivalent voltage. Therefore, the temperature increment of each magnetic pole is different during the operation of the electric machinery. Specifically, as an example of the opposing first and fifth magnetic poles 11 and 15, the temperature increment of the fifth magnetic pole 15 is larger than that of the first magnetic pole 11 since the fifth winding 151 has "9n" turns and the first winding 111 has only "1n" turns. In other words, the first magnetic pole 11 exhibits a relatively low temperature and the fifth magnetic pole 15 exhibits a relatively high temperature during the operation of the electric machinery. In this regard, although the armature magnetic poles 21 of the rotor 2 will have a higher temperature when passing through the fifth magnetic pole 15, the temperature of the armature magnetic poles 21 can be efficiently offset when passing through the first magnetic pole 11 due to the lower temperature of the first magnetic pole 11. Thus, it is understandable from the different temperatures among the magnetic poles of the 8-pole stator 1, the heat received by the rotor 2 during the rotation thereof can be better dissipated internally in the electric machinery. Thus, the cooling efficiency and the energy efficiency of the electric machinery are improved.

Based on the above descriptions, and since the magnetic impedance of the armature magnetic poles is characteristic of the loss of an electric machinery when the rotor rotates relative to the stator, a balanced rotation of the rotor 2 with improved energy efficiency can be achieved via the designed ratios of 1:8:3:4:9:2:7:6 for the numbers of turns of the first to eighth windings 111-181. In this vein, the difference of the magnetic fields between two adjacent magnetic poles would effectively reduce the magnetic impedance of the armature magnetic poles 21. As a consequence, the loss of the electric machinery would also be reduced, thus improving the electric generation efficiency or highest mechanical torque of the electric machinery.

Besides, when the overall temperature of the electric machinery increases, the magnetic losses due to the iron core, including its magnetic hysteresis and eddy current losses, and the resistive and eddy current losses of the copper coils of the electric machinery, would also increase. As a result of these losses, the reactive power of the electric machinery would increase, leading to a significant reduction in the efficiency of electric machinery. The heat received by the rotor 2 during the rotation thereof can be internally dissipated in the disclosed design by way of the temperature differences among the magnetic poles of the 8-pole stator 1, hence the cooling efficiency of the electric machinery is improved. Based on the 8-pole stator structure of the embodiment of the disclosure, the overall temperature of the 8-pole stator can be reduced by the reduction of losses from iron core and copper coils. Advantageously, the electricity generation efficiency or the highest obtainable mechanical torque is improved.

It can be readily appreciated by skilled people that when the 8-pole stator 1 of the embodiment of the disclosures is electrified to generate alternating magnetic field on the magnetic poles thereof, the 8-pole stator 1 will be able to drive a rotor to rotate. This in effect is a feedback operation as the 8-pole stator 1 has its magnetic field from the rotating rotor by induction, hence the driving force of the rotor is in part provided by what the rotor gives out, thus improving the efficiency of the disclosed electric machinery. This improvement is in addition to the enhanced cooling efficiency due to the disclosed winding strategy of the 8-pole stator 1 stated above. It is proven that the winding structure of the 8-pole stator 1 may be used to form an electric machinery whose temperature is only a few degrees Celsius above that before the machinery was in operation.

Figure 4:
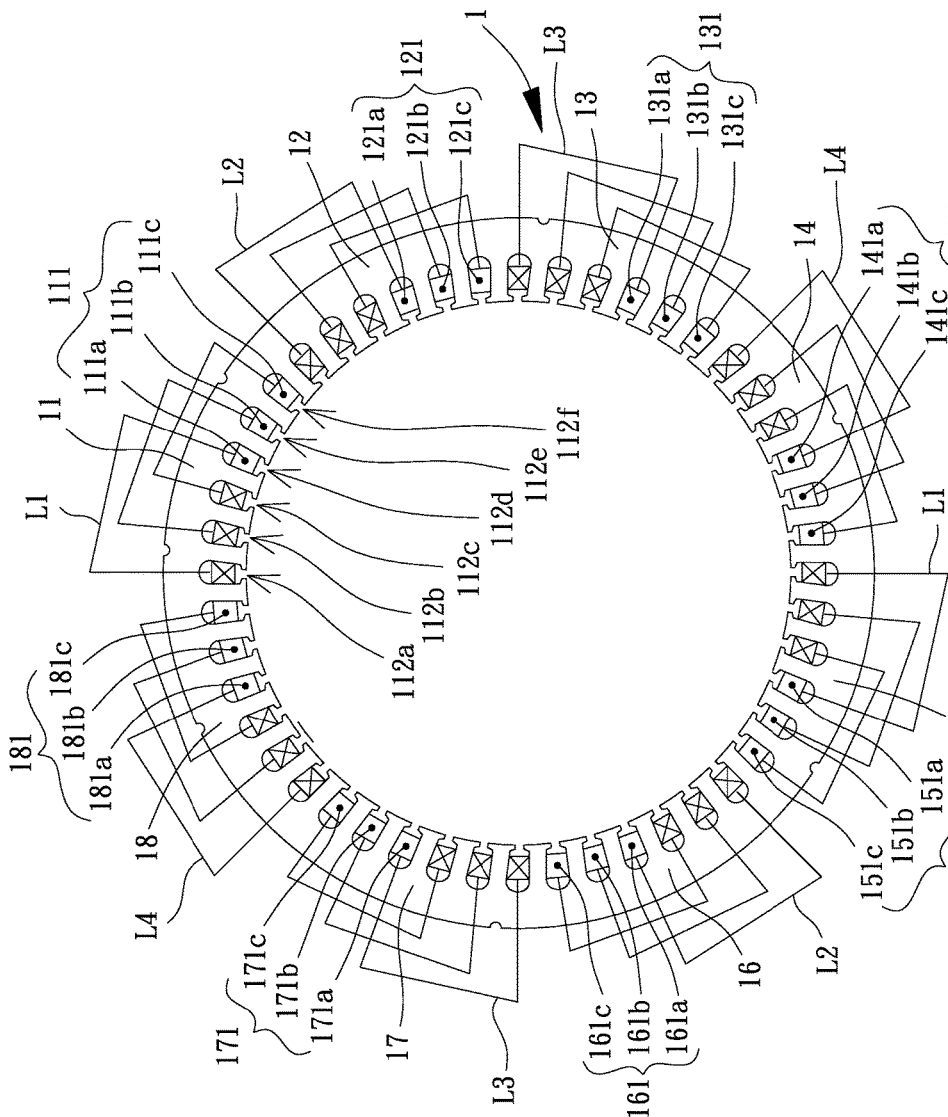
FIG. 4 shows a further implementation of the electric machinery of the embodiment of the disclosure.

In order to verify that the electric machinery of the embodiment of the disclosure has a higher electricity generation efficiency over the conventional one, the electric machinery of the embodiment of the disclosure is tested with conventional wiring of a three phase electric machinery which is formed by the 8-pole stator. As an illustration, FIG. 4 shows a further implementation of the electric machinery of the embodiment of the disclosure, wherein each magnetic pole of the 8-pole stator 1 includes 6 wire slots so that the pole distance of the 8-pole stator 1 is 6. In the arrangement, the first magnetic pole 11 includes a first wire slot 112a, a second wire slot 112b, a third wire slot 112c, a fourth wire slot 112d, a fifth wire slot 112e and a sixth wire slot 112f. The first winding 111 is wound by "n" turns in each of the first to sixth wire slots 112a-112f. Specifically, a first wire is wound by "n" turns in each of the first and fourth wire slots 112a and 112d first, then wound by another "n" turns in each of the second and fifth wire slots 112b and 112e, and finally wound by a further "n" turns in each of the third and sixth wire slots 112c and 112f. As such, the first winding 111 is formed. Similarly, each of the second to eighth magnetic poles 12-18 includes first, second, third and fourth wire slots, and the second to eighth windings 121-181 are respectively wound by "3n," "4n," "9n," "2n," "7n" and "6n" turns in each of the first to sixth wire slots. The total number of turns of the windings of the 8-pole stator 1 is 720 in which the number of turns of the first winding 111 is 18.

It is noted that in the implementation as shown in FIG. 4, the electric machinery is in a single phase and includes 8 magnetic poles. Thus, any two opposing magnetic poles may be wound by the same wire to form the windings thereof. Specifically, the first and fifth windings 111 and 151 may be formed by a first wire L1, the second and sixth windings 121 and 161 may be formed by a second wire L2, the third and seventh windings 131 and 171 may be formed by a third wire L3, and the fourth and eighth windings 141 and 181 may be formed by a fourth wire L4. The first, second, third and fourth wires L1, L2, L3 and L4 may be connected to each other in series or parallel.

Figure 5:
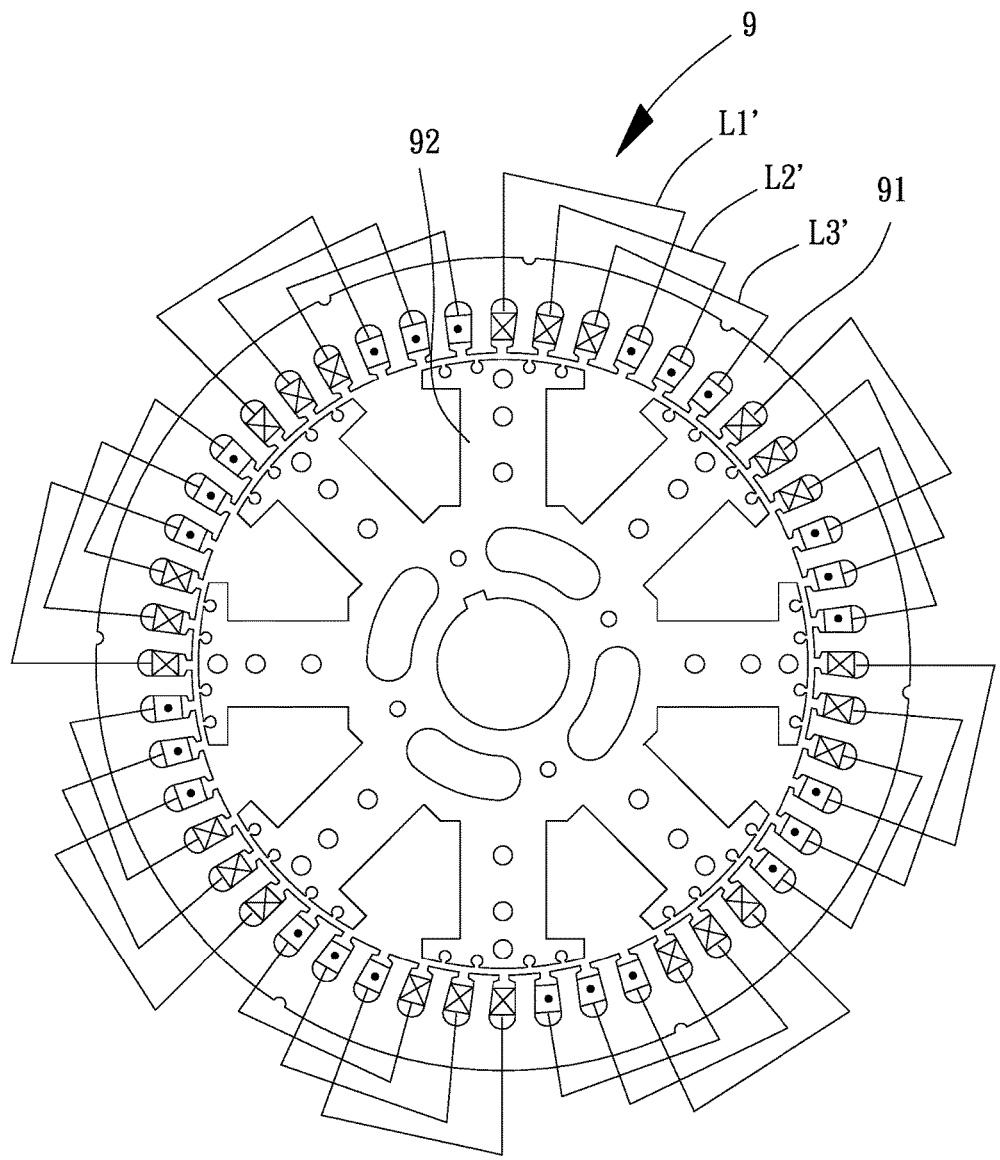
FIG. 5 shows a conventional electric machinery formed by an 8-pole stator.

FIG. 5 shows a conventional electric machinery 9 formed by an 8-pole stator. The conventional electric machinery 9 includes a stator 91 and a rotor 92. The pole distance of the electric machinery 9 is also 6. The conventional electric machinery 9 is formed by winding the same number of turns of a first phase wire L1', a second phase wire L2' and a third phase wire L3' around the individual magnetic poles of the stator 91, and the total number of turns of the windings of the stator 1 is 720. The winding mechanism of the stator 91 may be full-pitch winding or short-pitch winding, which has been described in U.S. Pat. No. 8,461,739 and can be readily appreciated by the people having ordinary skill in the art.

In the above, both the electric machinery of the embodiment of the disclosure and the conventional electric machinery include 8 magnetic poles with 48 wire slots. In the stator 1 of the embodiment of the disclosure and the stator 91 of the conventional electric machinery 9, both winding structures have the same total number of turns of 720. Based on this, a 10 HP electric motor with an output power of 7.5 kW and a rated speed of 1800 rpm is used to drive the rotor 2 and the rotor 92, and an electric heating tube having a rated power of 6 kW and a rated voltage of 220V is used as a load of the electric machinery. In this regard, the test results are shown in Table 1 below. Since the conventional electric machinery 9 is a three phase electric machinery, the test is conducted on an output side L12' between the first phase wire L1' and the second phase wire L2', as well as another output side L23' between the second phase wire L2' and the third phase wire L3'.

TABLE 1

|  | Electric Machinery of The Embodiment of The Disclosure | L12' of The Conventional Electric Machinery | L23' of The Conventional Electric Machinery |
| --- | --- | --- | --- |
| Voltage (V) | 219 | 223 | 223 |
| Current (A) | 28 | 16.7 | 16.26 |
| Power Factor (PF) | 0.995 | 0.854 | 0.871 |
| Active Power (KW) | 6.1 | 3.17 | 3.16 |
| Reactive Power (KVAR) | 0.6 | 1.94 | 1.75 |
| Apparent Power (KVA) | 6.14 | 3.51 | 3.56 |
| Phase Angle (°) | 5 | 31.4 | 29.5 |

From Table 1 above, it can be known that although both the electric machinery of the embodiment of the disclosure and the conventional electric machinery 9 include 8 magnetic poles with 48 wire slots, the electric machinery of the embodiment of the disclosure has a reactive power (0.6) much smaller than that of the conventional electric machinery 9 (about 1.85). Therefore, the electric machinery of the embodiment of the disclosure has a power factor (0.995) that is better than that of the conventional electric machinery 9 (about 0.86). As such, the electric machinery of the embodiment of the disclosure has a smaller reactive power, thereby demonstrating improved electricity generation efficiency thereof. It is worth mentioning that the electricity energy outputted by the electric machinery of the embodiment of the invention has a phase angle of 5°, which is much smaller than that outputted by the conventional electric machinery 9 (about 30.5°), providing another evidence that the electric machinery of the embodiment of the invention has a smaller reactive power. The winding structure of the stator and the electric machinery using the stator according to the embodiment of the disclosure do achieve a higher energy conversion efficiency.

Moreover, the reactive power of the conventional electric machinery 9 (about 1.85) is approximately 3 times larger than that of the electric machinery of the embodiment of the disclosure (about 0.6). Therefore, the overall temperature of the conventional electric machinery 9 during the operation thereof must be larger than that of the electric machinery of the embodiment of the disclosure. In order to make comparison, the temperature on each of the magnetic poles of the stator 1 is measured, and the first magnetic pole 11 is 45 degrees Celsius, which is the lowest among all of the magnetic poles 11-18. Similarly, the fifth magnetic pole 15 is measured to be 75 degrees Celsius, which is the highest among all of the magnetic poles. It is shown that each magnetic pole does have a different temperature from other magnetic poles, and the largest temperature difference among all of the magnetic poles 11-18 can be as large as 2.5 times. Since the fifth magnetic pole 15 takes only ⅛ of the entire circumference of the magnetic poles, the passage of an armature magnetic pole 21 through the highest temperature area (the fifth magnetic pole 15) is only ⅛ of the entire circumference. As such, the heat dissipation of the armature magnetic poles 21 is improved, and the heat received by the rotor 2 during the rotation thereof can be internally dissipated inside the electric machinery. Advantageously, the cooling effect of the electric machinery is improved. Based on this, the temperature of the electric machinery according to the embodiment of the disclosure is reduced, thus limiting the iron loss and copper loss thereof. As compared with the conventional electric machinery 9, the electric machinery of the embodiment of the disclosure has an improved cooling efficiency.

In summary, the winding structure of the stator and the electric machinery using the stator according to the embodiment of the invention are able to reduce the magnetic impedance of the rotor and to provide an improved cooling efficiency and the power efficiency as a while in general.

Although the disclosure has been described in detail with reference to its presently preferable embodiments, it will be understood by one of ordinary skills in the art that various modifications can be made without departing from the spirit and the scope of the disclosure, as set forth in the appended claims.

What is claimed is:

1. A winding structure of a stator, comprising a first magnetic pole, a second magnetic pole, a third magnetic pole, a fourth magnetic pole, a fifth magnetic pole, a sixth magnetic pole, a seventh magnetic pole and an eighth magnetic pole which are arranged in a circumferential direction, wherein the first to eighth magnetic poles include first to eight windings respectively, wherein each of the first to eight windings has a number of turns, and wherein the numbers of turns of the first to eight windings are in ratios 1:8:3:4:9:2:7:6, wherein the first to eighth windings have a total number of turns of "40n," and wherein 40n≥720.

2. The winding structure of the stator as claimed in claim 1, wherein the number of turns of the first winding is "n," the number of turns of the second winding is "8n," the number of turns of the third winding is "3n," the number of turns of the fourth winding is "4n," the number of turns of the fifth winding is "9n," the number of turns of the sixth winding is "2n," the number of turns of the seventh winding is "7n," and the number of turns of the eighth winding is "6n."

3. The winding structure of the stator as claimed in claim 2, wherein each of the first to eighth magnetic poles comprises a tooth portion, and wherein the tooth portions of the first to eighth magnetic poles are wound with the first to eighth windings, respectively.

4. The winding structure of the stator as claimed in claim 2, wherein each of the first to eighth magnetic poles comprises a plurality of wire slots and a plurality of tooth portions.

5. The winding structure of the stator as claimed in claim 4, wherein the plurality of wire slots comprises a first wire slot, a second wire slot, a third wire slot and a fourth wire slot, and wherein each of the first to eighth windings is wound in each of the first and third wire slots first, and then in each of the second and fourth wire slots.

6. The winding structure of the stator as claimed in claim 4, wherein the plurality of wire slots comprises a first wire slot, a second wire slot, a third wire slot, a fourth wire slot, a fifth wire slot and a sixth wire slot, and wherein each of the first to eighth windings is wound in each of the first and fourth wire slots first, then in each of the second and fifth wire slots, and finally in each of the third and sixth wire slots.

7. The winding structure of the stator as claimed in claim 2, wherein the first to eighth windings comprise a plurality of pairs of radially opposing windings, wherein each of the plurality of pairs of radially opposing windings has a same total number of turns, and wherein a total number of turns of the first winding plus the eighth and second windings is the same as a total number of turns of the third winding plus the second and fourth windings, is the same as a total number of turns of the fifth winding plus the fourth and sixth windings, and is the same as a total number of turns of the seventh winding plus the sixth and eighth windings.

8. An electric machinery including the winding structure of the stator as claimed in claim 2, further comprising a rotor, wherein the rotor comprises 8 armature magnetic poles respectively wound with 8 rotor windings.

9. The electric machinery as claimed in claim 8, each of the 8 rotor windings has a number of turns of "5n."

* * * * *